United States Patent
Li et al.

(12) 
(10) Patent No.: US 6,400,855 B1
(45) Date of Patent: Jun. 4, 2002

(54) N × N OPTICAL SWITCHING ARRAY DEVICE AND SYSTEM

(75) Inventors: Bulang Li, Austin, TX (US); Suning Tang, Fremont, CA (US)

(73) Assignee: Radiant Photonics, Inc., Austin, TX (US)

( * ) Notice: Subject to any disclaimer, the term of this patent is extended or adjusted under 35 U.S.C. 154(b) by 6 days.

(21) Appl. No.: 09/612,049

(22) Filed: Jul. 7, 2000

Related U.S. Application Data

(63) Continuation-in-part of application No. 09/550,480, filed on Apr. 14, 2000
(60) Provisional application No. 60/129,620, filed on Apr. 16, 1999.

(51) Int. Cl.[7] .......................... G02F 1/295; G02B 6/26; G02B 6/42
(52) U.S. Cl. .................... 385/4; 385/16; 385/36
(58) Field of Search ................. 385/16, 27, 36, 385/129, 130, 131

(56) References Cited

U.S. PATENT DOCUMENTS

| | | | | |
|---|---|---|---|---|
| 4,515,430 A | | 5/1985 | Johnson .............. 350/96.13 |
| 4,547,262 A | * | 10/1985 | Spillman, Jr. et al. ...... 216/24 |
| 4,648,687 A | | 3/1987 | Yoshida et al. .......... 385/16 |
| 4,690,489 A | | 9/1987 | Neyer .................. 350/96.14 |
| 4,738,502 A | * | 4/1988 | Mikami et al. ........... 385/4 |
| 4,753,505 A | * | 6/1988 | Mikami et al. ........... 385/5 |
| 4,758,062 A | | 7/1988 | Sunagawa et al. ...... 350/96.19 |
| 4,767,170 A | | 8/1988 | Mizutani et al. ....... 350/96.14 |
| 5,044,715 A | | 9/1991 | Kawachi et al. .......... 385/42 |
| 5,091,983 A | | 2/1992 | Lukosz .................. 385/13 |
| 5,173,956 A | | 12/1992 | Hosokawa et al. ........ 385/4 |
| 5,317,446 A | | 5/1994 | Mir et al. ............. 359/296 |
| 5,351,317 A | | 9/1994 | Weber .................. 385/3 |
| 5,353,363 A | | 10/1994 | Keck et al. ............. 385/46 |
| 5,359,684 A | | 10/1994 | Hosokawa et al. ........ 385/33 |
| 5,459,799 A | | 10/1995 | Weber .................. 385/2 |
| 5,574,806 A | | 11/1996 | Kragl et al. ............ 385/14 |
| 5,625,725 A | | 4/1997 | Nakano et al. .......... 385/14 |
| 5,802,223 A | * | 9/1998 | Nashimoto .............. 385/8 |
| 5,912,997 A | | 6/1999 | Bischel et al. .......... 385/15 |
| 5,920,662 A | * | 7/1999 | Hinkov ................ 385/14 |
| 6,035,080 A | | 3/2000 | Henry et al. ........... 385/14 |
| 6,041,149 A | | 3/2000 | Monte .................. 385/2 |
| 6,047,098 A | | 4/2000 | Sagawa et al. .......... 385/141 |
| 6,049,641 A | | 4/2000 | Deacon et al. .......... 385/15 |
| 6,064,787 A | | 5/2000 | Castoldi ............... 385/41 |
| 6,084,050 A | | 7/2000 | Ooba et al. ............ 528/42 |
| 6,122,416 A | * | 9/2000 | Ooba et al. ............ 385/16 |
| 6,246,809 B1 | * | 6/2001 | Jouanno et al. ......... 385/22 |

OTHER PUBLICATIONS

V.J. Fowler & J. Schlafer, A Survey of Laser Beam Deflection Techniques, Applied Optics: vol. 5, No. 10., at 1675–1682, Oct. 1966.

(List continued on next page.)

*Primary Examiner*—Hemang Sanghavi
*Assistant Examiner*—Scott Knauss
(74) *Attorney, Agent, or Firm*—Baker Botts L.L.P.

(57) ABSTRACT

An N×N optical switching array device and system are disclosed. In one aspect, an optical switching device for communicating optical signals is provided. The device includes a plurality of optical inputs operable to communicate optical signals, a plurality of optical outputs optically coupled to the optical inputs and at least one thermo-optic array optically coupled to the plurality of optical inputs and the plurality of optical outputs. The device further includes an thermo-optical array operable to deflect an optical signal from one of the plurality of optical inputs to one of the plurality of optical outputs in response to a temperature differential.

26 Claims, 5 Drawing Sheets

OTHER PUBLICATIONS

R.A. Meyer, Optical Beam Steering Using a Multichannel Lithium Tantalate Crystal, Applied Optics: vol. 11, No. 3, at 613–616, Mar. 1972.

Rod C. Alferness, Waveguide Electrooptic Switch Arrays, IEEE Journal on Selected Areas in Communications: vol. 6, No. 7, at 1117–1130, Aug. 1988.

M.D. Himel, X. Shi, X. Q. Hu, M.G. Moharam, and K.H. Guenther, Electrooptic Beam Deflection Using the Leaky Mode of a Planar Waveguide, IEEE Photonics Technology Letters: vol. 3, No. 10, at 921–923, Oct. 1991.

Allyson J. Beuhler, David A. Wargowski, Tony C. Kowalczyk, and Kenneth D. Singer, Optical Polyimides for Single Mode Waveguides, SPIE: vol. 1849, Optoelectronic Interconnects, at 92–101, Jun. 1993.

Ray T. Chen, Maggie Li, Suning Tang, Dave Gerald and Mark Peskin, Polymer–Based Chirped Grating Lens Working at Visible Wavelengths on a GaAs Substrate, SPIE: vol. 2042, at 474–477, Jan. 1994.

Suning Tang and Ray T. Chen, 1–to7 Highly Parallel Three–Dimensional Intra– and Inter–Board Optical Interconnects, IEEE Photonics Technology Letters: vol. 6, No. 2, at 299–301, Feb. 1994.

Suning Tang, Ray T. Chen, Rob Mayer, Dave Gerold, Tomasz Jannson, and Andrew Kostrzewski, Channel Cross-–Coupling in a Polymer–Based Single–Mode Bus Array, Journal of Lightwave Technology: vol. 13, No. 1, at 37–41, Jan. 1995.

Wenshen Wang, Datong Chen, Harold R. Fetterman, Yongqiang Shi, William H. Steier, and Larry R. Dalton, 40–GHz Polymer Electrooptic Phase Modulators, IEEE Photonics Technology Letters: vol. 7, No. 6, at 638–640, Jun. 1995.

Suning Tang, Maggie M. Li, and Ray T. Chen. A Novel Wavelength–Division–Demultiplexer with Optical In–Plane to Surface–Normal Conversion, IEEE Photonics Technology Letters: vol. 7, No. 8, at 908–910, Aug. 1995.

Y. Chiu, R.S. Burton, D.D. Stancil, and T.E. Schlesinger, Design and Simulation of Waveguide Electrooptic Beam Deflectors, Journal of Lightware Technology: vol. 13, No. 10, at 2049–2052, Oct. 1995.

Suning Tang and Ray T. Chen, Integrated Wavelength Tunable Filters Based on Resonant Mach–Zehnder Interferometer, SPIE: vol. 2400, at 55–60, May 1995.

Ray T. Chen and Julian P. Bristow, Optoelectronic Interconnects V, SPIE: vol. 3288, at 153–163, Jan. 1998.

Suning Tang, Bulang Li, Xinghua Han, John M. Taboada, Chiou–Hung Jang, Jin–Ha Kim, Lin Sun, and Ray T. Chen, An Integrated Thin–Film Thermo–Optic Waveguide Beam Deflector, Applied Physics Letters: vol. 76, No. 16, at 1–3, Feb. 2000.

* cited by examiner

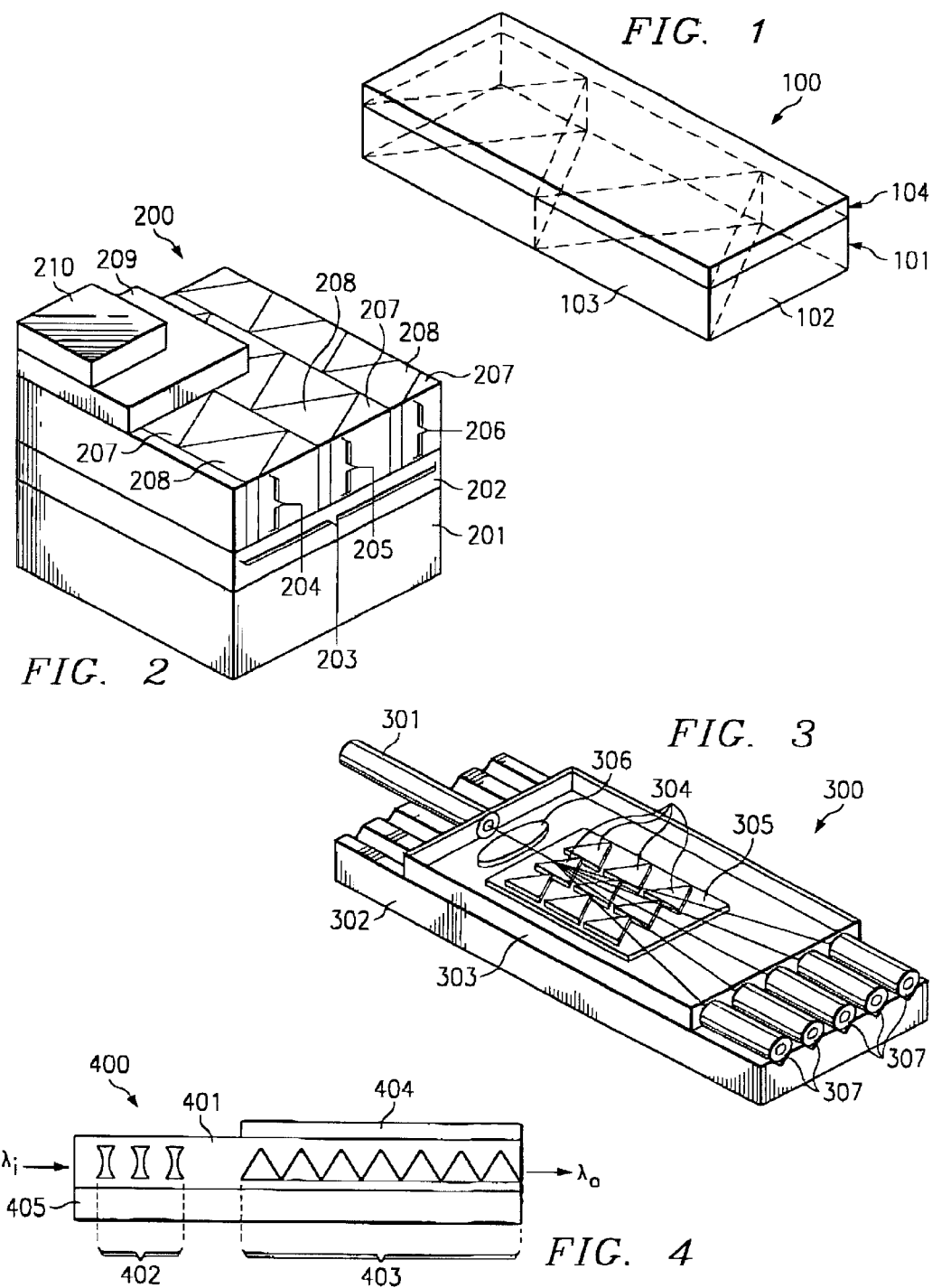

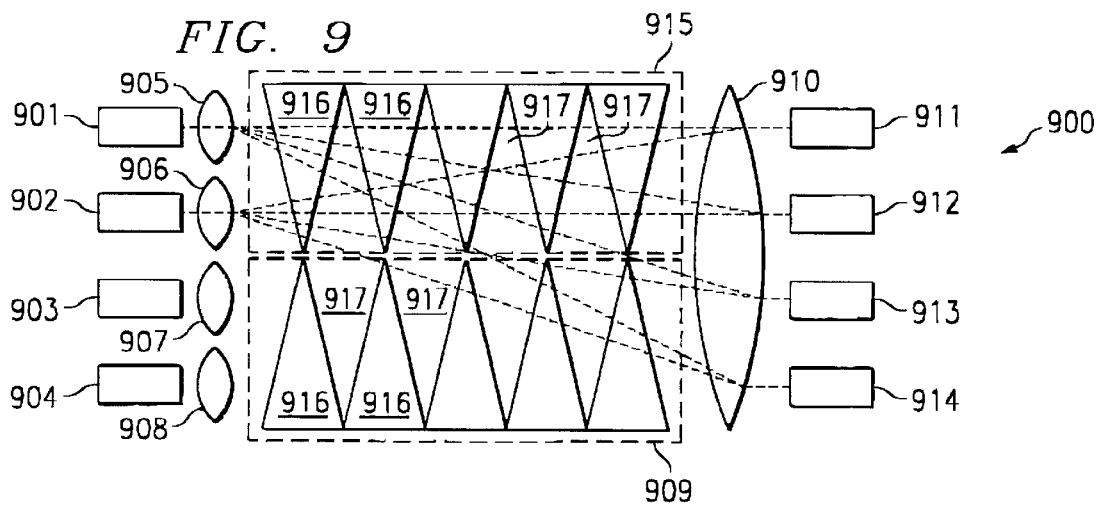
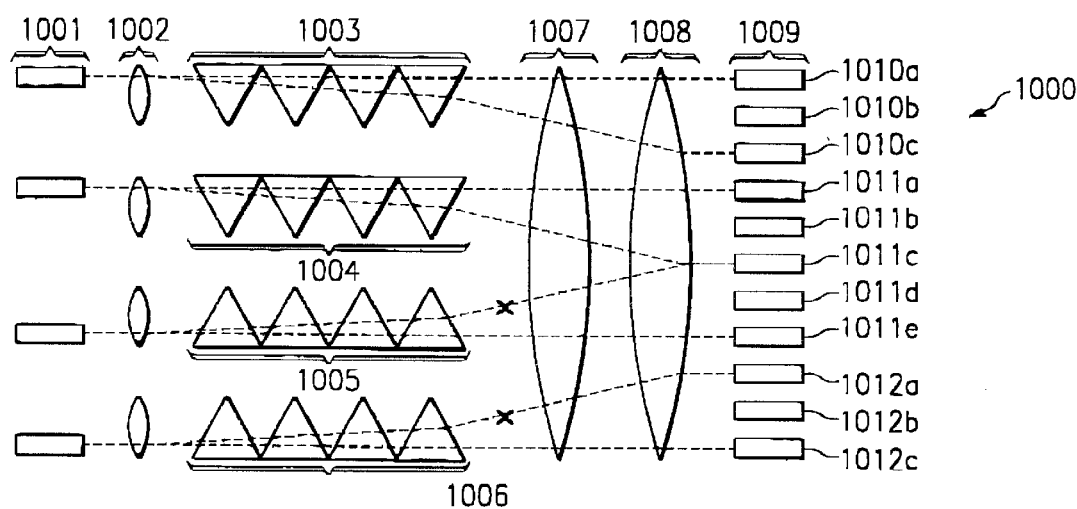
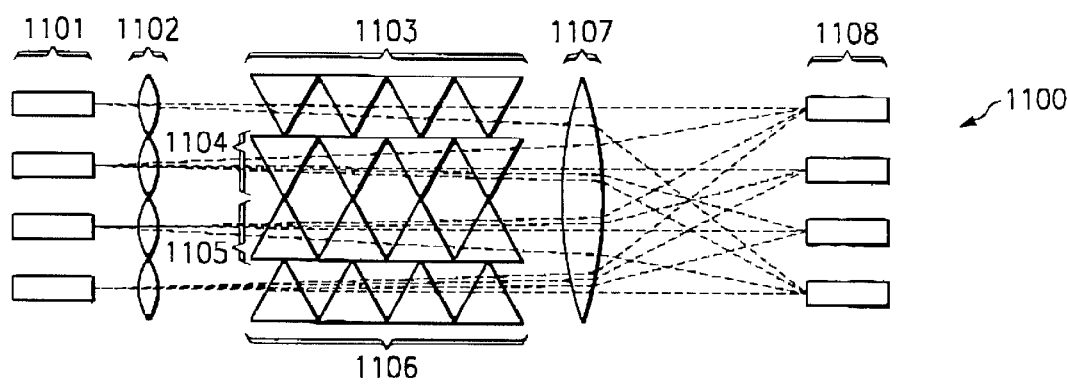

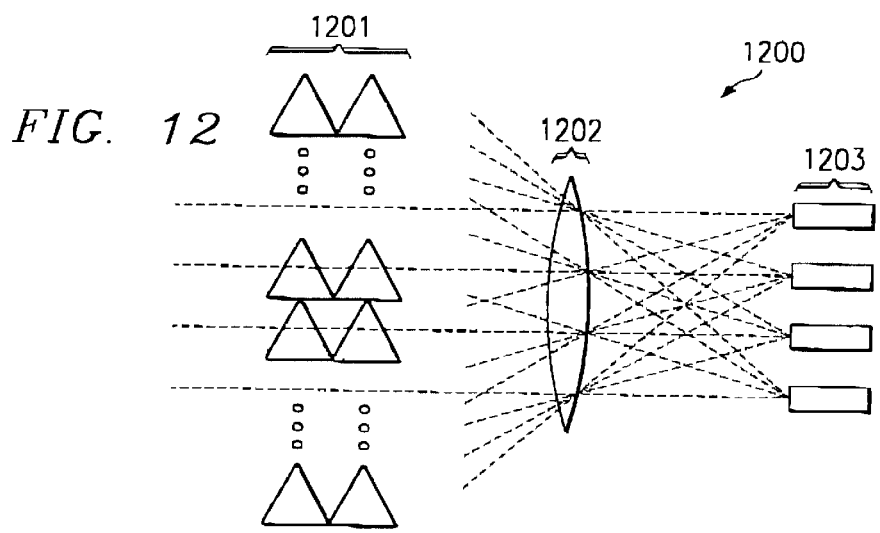
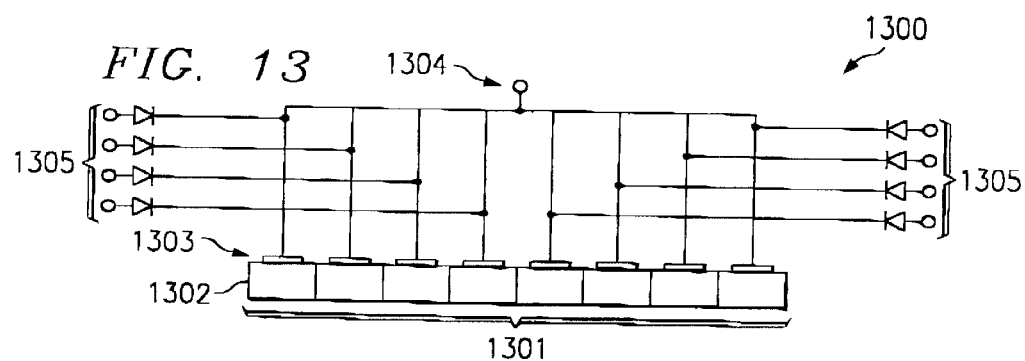
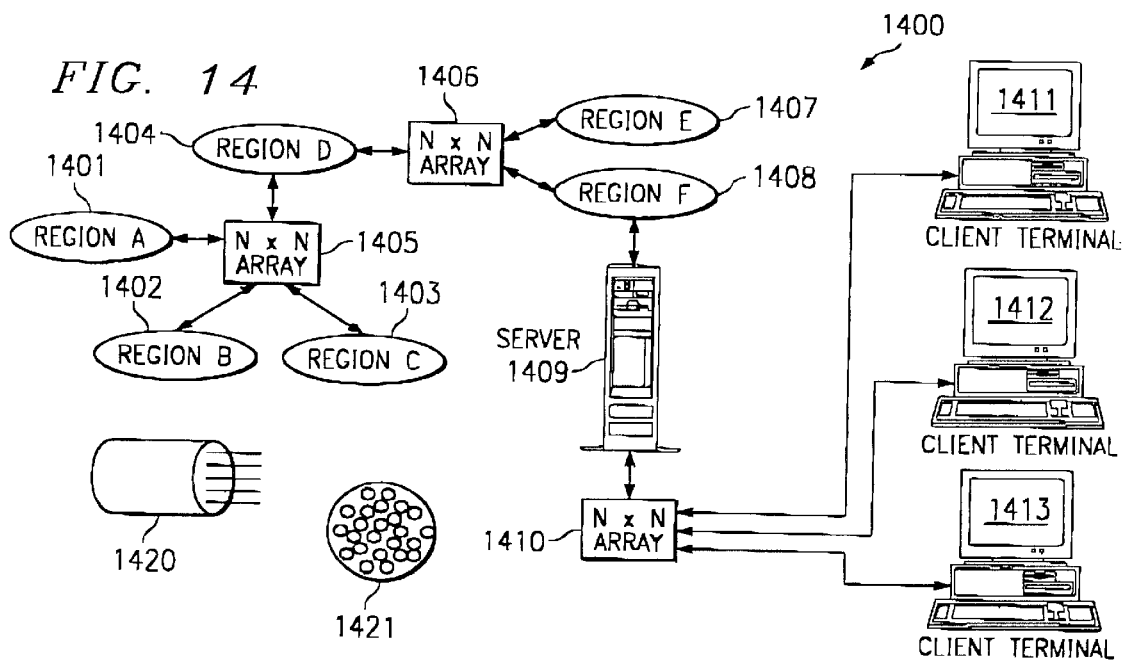

N × N OPTICAL SWITCHING ARRAY DEVICE AND SYSTEM

CROSS-REFERENCE TO RELATED APPLICATION

This application is a continuation-in-part of U.S. Utility patent application Ser. No. 09/550,480 filed Apr. 14, 2000, and entitled "Optical Waveguide Deflection System, Apparatus and Method of Fabrication" which claims priority to U.S. Provisional Patent Application Ser. No. 60/129,620 filed Apr. 16, 1999, and entitled "Polymeric Thermal Optical Prism Arrays for Fast Optical Switching".

GOVERNMENTAL RIGHTS

The invention was made with Government support under Contract No. F30602-99-C-0144 awarded by Air Force Research Laboratory, Information Directorate/IFKRF. The Government has certain rights in the invention.

TECHNICAL FIELD

The present invention generally relates to optics, and more particularly, to an N×N optical switching array device and system.

BACKGROUND

The increasing demand for high-speed broadband communications as resulted in a rapid increase in fibre optic communications systems which require faster and more reliable components to interconnect associated optoelectronic devices of a network. These components may include devices for steering light beams through light transmissive mediums at specific angles. Currently, devices use opto-mechanical or electro-optical technology to steer light beams to a specified angle.

Opto-mechanical technology for signal channeling or steering have several disadvantages. For example, opto-mechanical devices are bulky and slow due to the mechanical scanning devices employed for optical signal distribution. In addition, degradation of mechanical components often makes these devices less reliable. Opto-mechanical devices also require complicated three-dimensional angular alignment, resulting in a low tolerance to harsh environments. Furthermore, due to optical mode mismatching, opto-mechanical devices often fail to provide low-loss coupling among devices such as laser diodes, optical modulators, waveguide splitters, single-mode optic fibers, multi-mode optic fibers, and optical detectors.

Other conventional deflection devices use electro-optical technology to steer light beams. Since these devices do not require moving parts, they are generally faster and more reliable than opto-mechanical devices. One type of electro-optic (EO) deflector uses bulk crystals for beam steering. These devices, however, are generally large and heavy and require higher driving voltages (usually in the kV range). More compact devices with lower operating voltages include metallic electrodes on two sides of thin electro-optic crystals. For example, multichannel phase-array devices employ the electro-optical properties of crystals to achieve phase modulation. These devices have the advantage of low operating voltages (around 32 V, for example), but they typically suffer from the presence of multiple grating lobes.

Nonmechanical beam deflectors are of interest for many military and commercial applications such as laser tracking and targeting, optical data storage, optical switching, laser printing, scanning, optical sensing, optical computing, and laser control. Current beam steering systems are very complex, costly, and too large for most airborne/space applications. Devices for controlling the direction of a laser beam have been limited in the past, and restricted almost entirely to such methods as galvanic mirror, and acousto-optic and electro-optic beam deflection. These methods suffer from various problems including, high driving power, limited speed, low resolution, and complex fabrication. One of the most promising technologies to date for scanning a laser beam without any moving parts is electro-optical beam deflection. Additionally, electro-optic beam deflectors often include some advancements using domain reversal in ferroelectric crystals. As such, a major drawback of this conventional system is the demand of very high driving voltages (>1000 V).

Typical electro-optic deflectors also do not meet the demand imposed by most aircraft/space applications. The deflection angle of conventional electro-optic devices is too small to provide large scanning angles. Additionally, the driving voltage is high, which contributes to the possibility of a dielectric breakdown between closely-spaced electrodes. Further, the switching speed of these devices is typically less than the gigahertz level and the fabrication and technical development of these devices are complex and/or impose difficult operating processes.

SUMMARY

In accordance with teachings of the present invention, a method, system and apparatus are provided for deflection and switching of optical signals.

In accordance with one aspect of the present invention an optical switching device for communicating optical signals in a communications network is disclosed. The device includes a plurality of inputs optically coupled to at least one thermo-optic array and a plurality of outputs optically coupled to the thermo-optic array wherein the plurality of inputs and outputs cooperate with each other to communicate at least one optical signal via the thermo-optic array.

In accordance with another aspect of the present invention a network communications system for communicating optical signals is disclosed. The system includes a communication medium operable to communicate optical signals, a plurality of optical waveguides associated with the communications medium and a switching device operable to communicate signals from an initiating point to a selected destination point. The system preferably includes a switching device having an input optically coupled to at least one of the plurality of optical waveguides and an output optically coupled to at least one of the plurality of optical waveguides. the optical waveguides are preferably coupled with a thermo-optic array whereby the thermo-optic array is operable to deflect an optical signal from the initiating point to the selected destination point.

In accordance with another aspect of the present invention, an optical switching device for communicating optical signals is disclosed. The device includes a plurality of optical inputs operable to communicate optical signals and a plurality of optical outputs selectively coupled to the optical inputs. At least one thermo-optic array is optically coupled to the plurality of optical inputs and the plurality of optical outputs. The thermo-optical array is preferably operable to selectively deflect an optical signal from one of the plurality of optical inputs to one of the plurality of optical outputs in response to a temperature differential.

In accordance with another aspect of the present invention, an optical switching structure for communicating optical signals is provided. The structure includes a first cladding layer coupled to a substrate and an optical switching layer coupled to the cladding layer. The optical switching layer includes a first and second material forming an array. The structure further includes a thermal element operable to alter a temperature associated with the optical switching layer and coupled to the optical switching layer.

It is a technical advantage of the present invention to provide an optical deflection device having large thermo-optic coefficients in combination with low thermal conductivities resulting in the device having relatively low power consumption.

It is a further technical advantage of the present invention to utilize polymer technologies for large-scale integration of optical communication and switching devices.

It is another technical advantage of the present invention to provide thin-film waveguides including low power consumption optical polymers having desirable thermo-optic characteristics for communicating optical signals.

It is another technical advantage of the present invention to provide an optical device having advantageous geometric features, such as triangular, to provide waveguide prisms.

It is a further technical advantage of the present invention to provide alternatively a waveguide having positioned polymer and silica materials within, for example, a three layer planar waveguide.

It is another technical advantage of the present invention to provide an N×N optical waveguide array operable to efficiently switch optical signals without using mechanical devices or requiring optical to electrical conversions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates an optical waveguide deflection device according to one embodiment of the present invention;

FIG. 2 illustrates an optical waveguide deflection device array according to one embodiment of the present invention;

FIG. 3 illustrates an optical waveguide deflection system according to one embodiment of the present invention;

FIG. 4 illustrates an optical waveguide deflection system according to another embodiment of the present invention;

FIG. 9 illustrates a thermo-optic N×N deflection system for switching optical signals in accordance with the teachings of the present invention;

FIG. 10 is a schematic drawing illustrating another thermo-optic N×N deflection system in accordance with the teachings of the present invention;

FIG. 11 is a schematic illustration of a wide angle thermo-optic deflection system in accordance with the teachings of the present invention;

FIG. 12 is a schematic illustration of another wide angle thermo-optic deflection system in accordance wit the teachings of the present invention;

FIG. 13 is a schematic illustration of a N×N deflection system and control circuit in accordance with the teachings of the present invention; and FIG. 14 illustrates a communication network incorporating an N×N switching array system in accordance with the teachings of the present invention.

DETAILED DESCRIPTION OF THE INVENTION

Figure 5A:
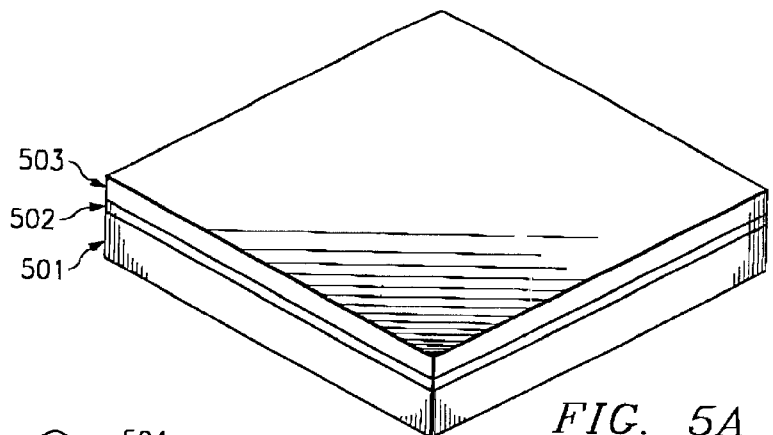
FIG. 5A is a schematic drawing showing an isometric view of a substrate for fabricating an optical waveguide deflection device according to one aspect of the present invention.

Preferred embodiments and their advantages are best understood by reference to FIGS. 1 through 14, wherein like numbers are used to indicate like and corresponding parts.

The conceptual groundwork for the present invention involves utilizing a thermo-optic effect to provide optical waveguide beam deflections or switching of optical signals. Deflection of an optical signal may be realized through utilizing thin-film materials having desirable thermo-optic coefficients. In one form, materials such as polymer and silica having desirable thermo-optic coefficients may be operable to provide desired optical beam deflection. Materials such as polymer and silica, having opposite thermo-optic coefficients, result in an opposed index of refraction modulation with respect to a change in temperature. Such materials selected in accordance wit the teachings of the present invention provide relatively low-power optical beam deflections of optical signals capable of relatively large scanning angles.

The thermo-optic beam effect in optical thin-film waveguides presents an attractive alternative for fabricating low-power optical beam deflectors or switching devices with large scanning angles. At present, polymers and silica provide reliable optical waveguide materials for thermo-optic applications. Optical silica thin films may be derived from the well-established silica-on-silicon technology for passive waveguide components, whereas optical polymeric thin films may be provided for optoelectronic interconnect applications. Some polymers which may be used in accordance with the teachings of the present invention may include, but are not limited to, polymethylmethacrylate (PMMA), benzocyclobutenes (BCB), polyimide, polyurethane, and epoxies operable to be used in association with the present invention. Certainly, as other materials are developed, they may be substituted for, or incorporated with, the materials disclosed herein without departing from the scope of the present invention.

FIG. 1 illustrates an optical waveguide deflection device according to one embodiment of the present invention. Deflection device 100 includes an optical waveguide 101 comprised of a first region 102, a second region 103, and a thermal element 104 thermally coupled to optical waveguide 101. First region 102 and second region 103 may be provided having a predetermined geometric dimension for producing desirable angles of deflection for a propagating optical signal. For example, first region 102 and second region 103 may be triangularly formed to provide several prisms within waveguide 101. First region 102 and second region 103 may be comprised of materials having different thermo-optical coefficients. For example, first region 102 may be formed from a material having a positive thermo-optic coefficient and second region 103 may be formed from a material having a negative thermo-optic coefficient. In this manner, varying the relative temperature of thermal element 104 alters the index of refraction of the materials, resulting in desirable deflections of an incident optical signal.

A thermo-optic response may be provided in association with a change in temperature by altering the index of refraction of first region 102 having of a first material and second region 103 having of a second material. A change in refraction may be observed by:

$$\Delta n = \frac{dn}{dT} \Delta T \qquad (1)$$

The thermo-optic index of refraction change Δn may then result in a deflection angle θ by:

$$\theta = (\Delta n)\frac{L}{h} = (|\Delta n_{(1)}| + |\Delta n_{(2)}|)\frac{L}{h} \qquad (2)$$

Where L may be the length of waveguide 101 and h may be the height of waveguide 101. Utilizing equation (1) and equation (2), a deflection sensitivity for a thermo-optic device such as deflection device 100 may be calculated by:

$$Deflection\ Sensitivity = d\theta/dT \qquad (3)$$

As such, a change in temperature may provide an index of refraction change in the first and second materials which constructively contribute to a total index of refraction change of deflection device 100. For example, first region 102 may be comprised of a polymer material having a thermo-optic coefficient of $-7\times10^{-5}/°$ C. Second region 103 may be comprised of a silica having a thermo-optic coefficient of $1\times10^{-5}/°$ C. Additionally, waveguide 101 may have a length of L of approximately seven millimeters and a height h of approximately five hundred and twenty micrometers. Therefore, a deflection sensitivity of 0.06° C. may be calculated utilizing equations 1–3 for deflection device 100. As such, a change in temperature may cause the refractive indices of the polymer and the silica to change in opposite directions, resulting in a controlled index of diffraction difference between the polymer and silica regions. For example, a relative increase in temperature of thermal element 104 may be proportional to the dissipated electrical power density and inversely proportional to the thermal conductivity of waveguide's 101 material. In addition, the thermo-optic coefficient of polymers ($-1.4\times10^{-4}/°$ C.) is an order of magnitude larger than that of silica ($+1\times10^{-5}/°$ C.) and have oppositely signed thermo-optic coefficients.

In other embodiments, different types of materials may be used to provide a desirable thermo-optic response. Many optical polymers have thermo-optic coefficients in the order of $-10^{-4}/°$ C. and silica thin films have thermo-optic coefficients in the order of $10^{-5}/°$ C. As illustrated by equations 1 through 3, the thermo-optic response is generally a linear function of temperature change. For example, materials having different relative thermo-optic coefficients with the same signs may be used to create a desirable thermo-optic response. Materials having higher or lower relative thermo-optic coefficients may provide a desirable thermo-optic response and deflection of an optical signal. Polymer and silica only illustrate one example of providing two materials having different thermo-optic coefficients responsive to changes in temperature of the materials to deflect optical signals. Other embodiments may include materials having desirable thermo-optic coefficients such as polycrystalline lanthanum modified lead titonate zirconate.

FIG. 2 illustrates an optical waveguide deflection device array according to one embodiment of the present invention. Deflection device 200 includes a lower cladding layer 202 coupled to substrate 201. Array 203 preferably includes first optical waveguide 204 comprised of alternating first regions 207 and second region 208. Similarly, optical waveguides 205 and 206 preferably include alternating first regions 207 and second regions 208. An upper cladding layer 209 and thermoelement 210, operable as a thermal element such as a heating electrode, a Peltier device, etc., are thermally coupled to array 203 for providing a desired temperature differential.

During operation, thermoelement 210 may provide a temperature differential to alter the indices of first regions 207 and second regions 208 and deflect optical signals a desirable amount. For example, an optical signal may be deflected from first waveguide 204 to a region within second waveguide 205 where the optical signal may be incident on a region within second waveguide 205. As such, second waveguide 205 may deflect the incident optical signal a desirable amount to third waveguide 206. In this manner, an optical signal incident to waveguide 204 may be deflected or switched to a desirable optical waveguide, such as waveguide 206, thereby providing an efficient thermo-optic deflection device operable to deflect an incident optical signal to desirable output devices optically coupled to optical device 200.

FIG. 3 illustrates an optical waveguide deflection system according to one embodiment of the present invention. Optical waveguide deflection system 300 includes an optical input 301 such as an optical waveguide, fibre optic cable, etc., coupled to mounting surface 302. Deflection system 300 includes an optical deflection device 303 coupled to mounting surface 302 and includes lens 306, such as a collimator, optically coupled to array 305. Array 305 includes a plurality of optical deflection prisms 304 and may be optically coupled to outputs 307 which may include several optical waveguides, fibre optic cables, etc.

During use, an optical signal may be provided by input source 301 to optical device 303. The signal incident on optical device 303 may be collimated utilizing lens 306 and optically coupled to array 305. Array 305 may be comprised of a plurality of waveguides similar to FIG. 1 and FIG. 2 and operable to selectively deflect an optical signal utilizing a thermo-optic effect. For example, system 300 may provide a temperature differential to optical device 303 such that a composite index of refraction of optical array 305 may be altered to deflect or switch an optical signal to a desired output 307.

System 300 advantageously provides a low cost, low power consumption approach to switching optical signals to desirable outputs. System 300 may be realized as a microelectronic device operable to provide a thermo-optic response to variances in temperature. Additionally, associated electronic circuitry (not expressly shown) may be provided in association with system 300 to provide a desirable thermo-optic response of waveguide 303. As such, integration of system 300 within microelectronic circuitry allows for efficient production of system 300 in association with fabricating microelectronic devices.

FIG. 4 illustrates an optical waveguide deflection system according to another embodiment of the present invention.

System 400 includes a waveguide 401 preferably coupled to a substrate 405. Waveguide 401 includes a plurality of concave optical lenses 402 for optically coupling input $\lambda_i$ to optical array 403. In one embodiment, optical array 403 may include the same or similar material as optical lenses 402 thereby providing optical components made of similar materials. As such, a potential reduction in fabrication processes may be realized when fabricating system 400. Thermoelement 404 may be thermally coupled to array 403 to provide variations in temperature thereby altering the refractive indices of waveguide 401 and array 403.

During use, system 400 may be operable to deflect an input signal $\lambda_i$ a desirable amount through providing a temperature variance utilizing thermoelement 404 thermally coupled to waveguide 401 comprised of array 403. The input signal may be collimated by optical lenses 402 and optically coupled to array 403 through waveguide 401 having a first index of refraction. Array 403 may be formed from a material having a second index of refraction such that, upon providing a variance in temperature, a desirable thermo-optic response may be provided and input signal $\lambda_i$ may be deflected a desirable amount. Though not illustrated, a desirable angle of deflection may be provided by each prism within array 403. For example, each prism may provide two degrees of deflection at a relative temperature variance of five degrees Celsius. As such, an array having five prisms may provide a total of ten degrees of deflection for input signal $\lambda_i$. Therefore, system 400 may be operable to provide several deflection angles for output signal $\lambda_o$ by varying the relative temperature of waveguide 401.

Thermoelement 404 may be configured and positioned in a plurality of ways. For example, thermoelement may entirely cover waveguide 401, partially cover waveguide 401, be coupled to the back surface of waveguide 401, etc. or other configurations or positions without departing from the scope of the present invention.

In one embodiment, waveguide 401 may be comprised of a thin-film polymer material having a thermo-optic coefficient of approximately $-10^{-4}/^\circ$ C. Additionally, array 403 may comprise a $GeO_2$ doped thin film silica having a thermo-optic coefficient of approximately $10^{-5}/^\circ$ C. Therefore, a change in temperature may be provided by thermoelement 404 to alter the composite index of refraction of waveguide 401 comprised of array 403. As such, desirable angles of deflection may be realized utilizing a polymer based waveguide advantageously allowing for low-power consumption of energy when altering the temperature of waveguide 401. Additionally, low-power sources for incident optical signals may be realized due to minimizing power losses associated with communicating optical signals via polymer waveguides having passive optical switching capabilities.

FIG. 5A is a schematic drawing showing an isometric view of a substrate for fabricating an optical waveguide deflection device according to one aspect of the present invention. Substrate 501 may include different types of material such as silicon, germanium, etc., and includes upper cladding layer 502 coupled to the surface of substrate 506. Guiding layer 503 is coupled to upper cladding 502 and may include a thin-film $GeO_2$ of doped silica coupled to cladding layer 502 comprised of oxide or an oxide derivative such as silicon dioxide. The resulting structure may be prefabricated on the upper surface of substrate 501 and configured as a waveguide.

Figure 5B:
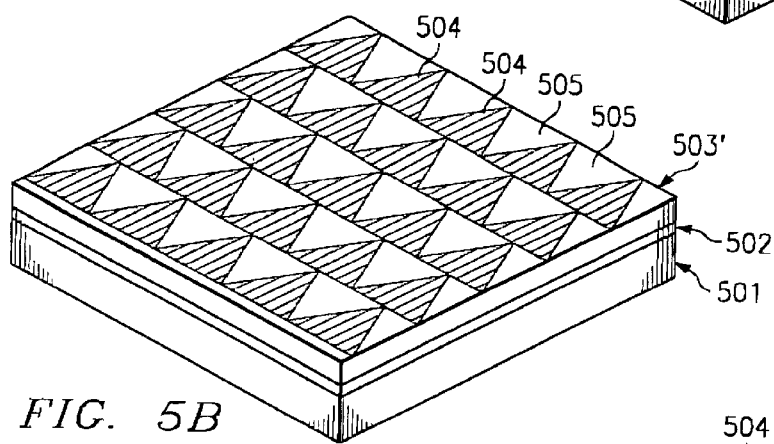
FIG. 5B illustrates the substrate of FIG. 5A having a plurality of defined geometric regions.

FIG. 5B illustrates the substrate of FIG. 5A having a plurality of defined geometric regions, such as triangles or microprisms operable to deflect optical signals. Guiding layer 503 of FIG. 5A may be fabricated to include the array of prisms having alternating first material 504 and second material 505 resulting in guiding layer 503'. Guiding layer 503' comprised of microprisms having alternating material types may be used to provide a deflection based upon a relative temperature change of the prisms and the thermo-optic coefficients of the materials.

Figure 5C:
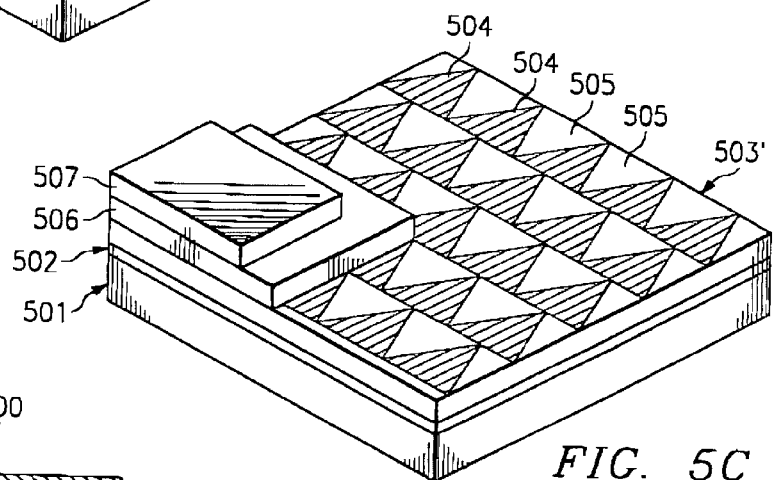
FIG. 5C illustrates the substrate of FIG. 5B incorporating a cladding layer and a thermoelement.

FIG. 5C illustrates the substrate of FIG. 5B incorporating an upper cladding layer and a thermoelement. Upper cladding layer 506 may be comprised of a polymer material spun coated onto the upper surface of guiding layer 503'. Thermoelement 507 may be coupled to second cladding layer 506 such that a variance in temperature may be provided. In another embodiment, thermoelement 507 may comprise a layer of chromium operable as a heating element to create a variance in temperature of guiding layer 503'. In one embodiment, thermoelement 507 may be coupled to selective regions of guiding surface 503'. As such, a variance in temperature may be provided to separate regions of guiding surface 503' thereby providing localized temperature variations and associated thermo-optical responses of guiding layer 503'.

In one embodiment, the thin-film thermo-optic waveguide beam deflector illustrated in FIG. 5C may be fabricated using an optical polymer and $GeO_2$ doped silica waveguide. Substrate 501 may include a planar thin-film silica waveguide layer as guide layer 503 having a thickness of approximately five micrometers. Additionally, cladding layer 502 may be comprised of $SiO_2$ having a thickness of approximately fifteen micrometers. Guiding layer 503 may then be patterned to provide an array of triangular geometric regions or microprisms within guiding layer 503'. The patterned layer may then be etched using a reactive ion etching (RIE) technique operable to etch silica-on-silicon planar waveguide substrates to fabricate microprism structures or regions. For example, micrometer equilateral triangles may be fabricated within guiding layer 503. The resulting microprism cavities within guiding layer 503 may then be spun coated with an optical crosslinking polymer having a similar refractive index as guiding layer 503. For example, the polymer may have a room temperature refraction index of approximately 1.464.

In one embodiment, low-loss cross-linked polyacrylates may be used in association with fabrication of guiding layer 503' and upper cladding layer 502 and lower cladding layer 506 with each having an optical refractive indices of 1.464 and 1.420, respectively. These polymers have a glass transition temperature $T_g$ of 60° C. and are thermally stable up to approximately 250° C. After cross-linking an optical loss of approximately 0.2 dB/cm at 633 nm and 0.3 dB/cm at 1550 nm may occur. Cross-linking the polymer may be accomplished by spin-coating the optical polymer on the surface of guiding layer 503 to assist in providing guiding layer 503'. The polymer waveguide arrays may then be cross-linked by exposing the structure to ultraviolet light at a specified pressure. For example, the structure may be exposed to an EFO Sultracure 100 ss Plus Lamp for forty minutes. The optical characteristics may then be evaluated with the Metricon 2010 Prism Coupler System for optical loss and index measurements.

Polymer-coated guiding layer 503' may then be polished and examined with a microscope inspection system to ensure that guiding layer 503', comprised of polymer and doped silica, have a thickness of approximately five micrometers. Upon obtaining a desirable structure, guiding layer 503' may then be spun coat with a polymer layer to form upper cladding layer 506 having a refraction index of approximately 1.420 and a thickness of approximately five micrometers. The overall length of guide layer 503' may have an approximate length of seven millimeters. Upon providing upper cladding layer 506, thermoelement 507 comprised of a thin-film metal, such as chromium, may then be deposited on upper cladding layer 506.

Figure 6:
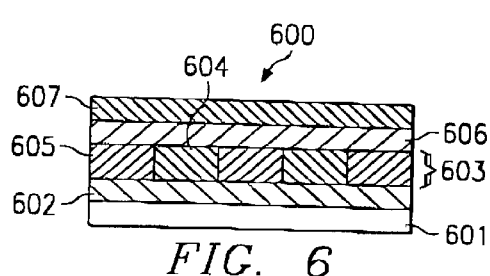
FIG. 6 illustrates a cross-sectional view of a thin-film optical waveguide deflection device according to one aspect of the present invention.

FIG. 6 illustrates a cross-sectional view of an optical waveguide deflection device according to one aspect of the present invention. Device 600 includes several layers configured to provide a thermo-optical waveguide deflection device and may be fabricated, for example, using conventional semiconductor process techniques such as the methods described above. Substrate 601 includes cladding layer 602 adjacent to substrate 601. Waveguide layer 603 includes first region 604 and second region 605 alternatingly deposed within waveguide layer 603. First region 604 and second region 605 may include different materials having different indices of refraction and thermo-optical coefficients.

Structure 600 may further include an upper cladding 606 coupled to the upper surface of waveguide 603 and thermoelement 607 coupled to upper cladding such that a variance in temperature may be coupled to waveguide 603. In one embodiment, thermoelement 607 may be directly coupled to cladding 606 for providing a temperature differential. However, other embodiments may include coupling thermoelement 607 to other regions of structure 600. Alternatively, thermoelement 607 may be disposed adjacent to structure 600 such that a temperature differential may be provided to waveguide 605.

In one embodiment, thermoelement 607 may include one or more Peltier devices thermally coupled to structure 600. For example, a Peltier device may provide a temperature change of 60° C. utilizing approximately one hundred milliwatts of electrical power consumption when coupled to substrate 601. In another embodiment thermoelement 607 may include a heating electrode made of a thin-film material such as chromium operable to provide a variance in temperature through providing a current flow through the chromium operable as thermoelement 607.

In one embodiment, first region 604 may comprise a polymer material having thermo-optical coefficient of approximately $-1.4 \times 10^{-4}/°$ C. Additionally, second region 605 may include a silica material having a thermo-optical value of $+1 \times 10^{-5}/°$ C. As such, thermoelement 607 may provide a change in temperature thereby creating a modulated index of refraction of waveguide laser 603. In this manner, desirable thermo-optic responses may be used to deflect an incident or propagating optical signal a desirable amount.

Figure 7:
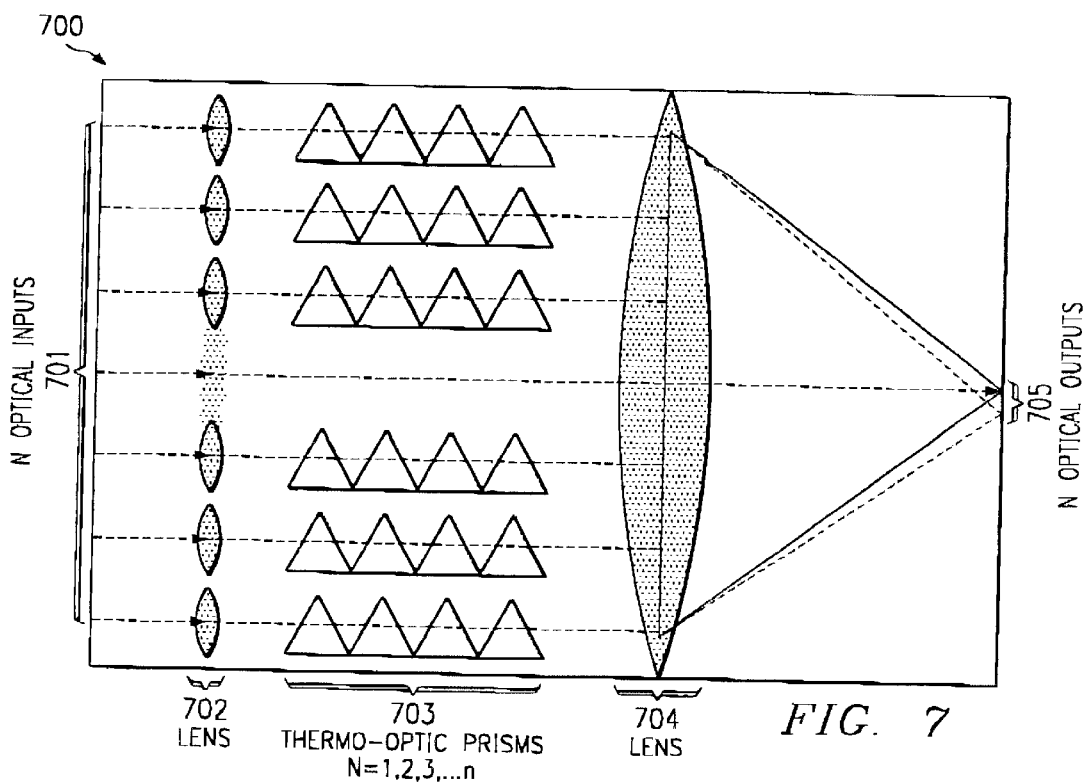
FIG. 7 is an illustration of a multiple input thermo-optical N×N deflection system for switching optical signals in accordance with the teachings of the present invention.

FIG. 7 is an illustration of a multiple input thermo-optic N×N deflection system for switching optical signals in accordance with the teachings of the present invention. The system, illustrated generally at 700, includes a plurality of optical inputs shown collectively at 701 and associated input lenses 702 optically coupled to optical inputs 701. Input lenses 702 are optically coupled to a plurality of thermo-optic prisms 703 which are optically coupled to an output lens 704. Output lens 704 is coupled to a plurality of optical outputs shown collectively at 705. System 700 having thermo-optic prisms 703 further includes a thermal element (not shown) for providing a temperature differential for thermo-optic prisms 703. During use a thermal element may provide a temperature differential to system 700 such that optical signals incident to optical inputs 701 may be diffracted or switched to a desirable optical output at optical outputs 705. For example, thermo-optic prisms 703 may include materials such as polymer and silica having thermo-optic coefficients that may be operable to provide a desirable diffraction of an incident signal to system 700. As such, a thermal element providing a temperature differential to thermo-optic prisms 703 may diffract an optical signal incident to optical inputs 701 to a desirable optical output at optical outputs 705. Further system 700 having of a plurality of optical inputs 701 may be operable to receive a plurality of input signals incident to optical inputs 701. As such, a plurality of optical inputs incident to thermo-optic prisms 703 may be switched or deflected to a desirable optical output for a given temperature differential.

Figure 8:
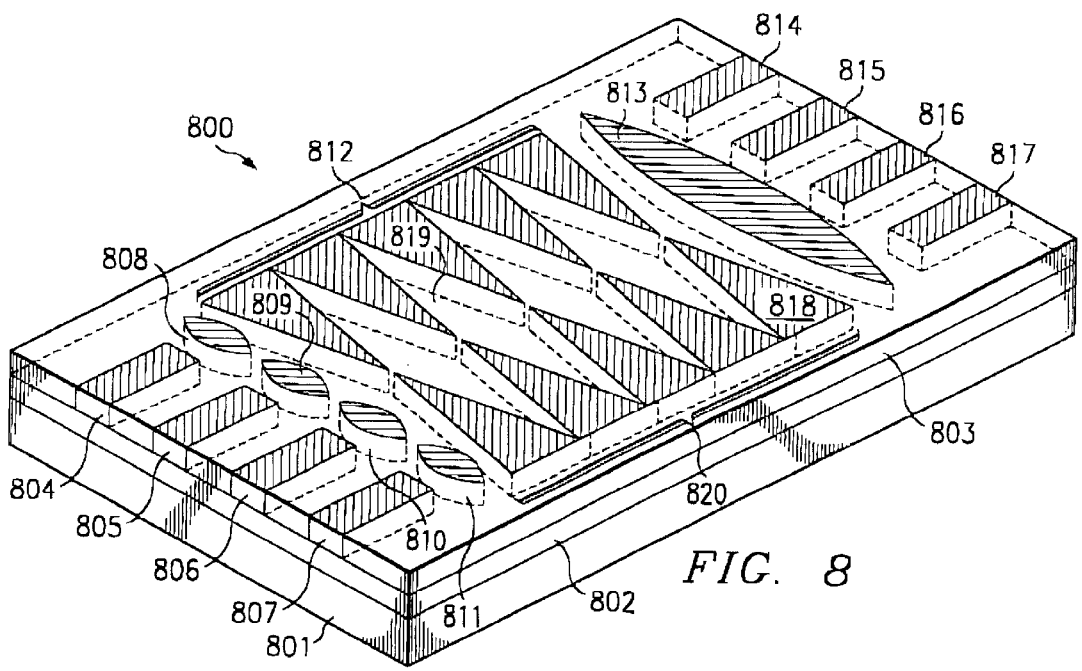
FIG. 8 is a schematic drawing showing an isometric view of a thermo-optic deflection system in accordance with the teachings of the present invention.

FIG. 8 is a schematic drawing showing an isometric view of a thermo-optic N×N deflection system in accordance with the teachings of the present invention. System 800 may be fabricated in a plurality of ways such as utilizing conventional semiconductor process techniques. System 800 includes a cladding layer 802 coupled to a substrate 801. A waveguide layer 803 may be coupled to cladding layer 802 for communicating optical signals. Waveguide layer 803 includes a first optical input 804, a second optical input 805, a third optical input 806, and a fourth optical input 807. First optical 804 includes a first input lens 808, second optical input 805 includes a second input lens 809, third optical input 806 includes a third input lens 810, and fourth optical input 807 includes a fourth input lens 811. In one embodiment optical input lenses 808, 809, 810, 811 may be configured as concave lenses operable to optically communicate a signal incident to optical inputs 804, 805, 806, 807 respectively.

System 800 further includes a first optical array 812 and a second optical array 820 optically coupled to input lenses 808, 809, 810, and 811. First optical array 812 and second optical array 820 include a first region 818 comprised of a first material and a second region 819 comprised of a second material. In one embodiment, first region 818 may include a material such as polymer and second as region 819 may include a material, the same material as waveguide layer 803. As such, a change in temperature of first optical array 812 and/or second optical array 820 may provide a modulated index of refraction for first region 818 and second region 819 operable to alter as an optical path in response to a change in temperature. System 800 further includes an output lens 813 optically coupled to first optical array 812 and second optical array 820 and first optical output 814, second optical output 815, third optical output 816, and fourth optical output 817.

As illustrated, first optical array 812 and second optical array 820 are oriented opposite to one another. For example, each optical array may include a plurality of regions 818 formed substantially as prisms and opposing one another. Region 818 within second optical array 820 may be positioned such that a prism 818 within first optical array 812 will be oppositely oriented. As such, system 800 advantageously allows a signal to be deflected to one of the optical outputs 814, 815, 816, and 817 while minimizing the overall site of system 800.

During use system 800 may deflect an incident optical signal in response to a change in temperature. For example, an optical signal may be incident to first input 804 and optically coupled to first optical array 812 and second optical array 820 through first input lens 808. A temperature differential may be provided to first optical array 812 and second optical array 820 such that the optical signal incident to first optical input 804 may be diffracted or switched to a desirable output such as fourth optical output 817. As such, an incident signal to one of the optical inputs may be switched to a desirable optical output through providing a temperature differential to first optical array 812 and second optical array 820.

FIG. 9 illustrates a thermo-optic N×N deflection system in accordance with the teachings of the present invention. The system, shown generally at 900, includes a first optical input 901 coupled to a first input lens 905, a second optical input 902 coupled to a second input lens 906, a third optical input 903 coupled to a third input lens 907, and a fourth optical input 904 coupled to fourth optical input lens 908. System 900 further includes a first thermo-optical array 909 which includes alternating first regions 916 and second regions 917. Similarly system 900 includes a second optical array 915 which includes first regions 916 and second regions 917.

System 900 further includes an output lens 910 coupled to first thermo-optical array 909 and second thermo-optic array 915. Output lens 910 is optically coupled to first optical output 911, second optical output 912, third optical output 913, and fourth optical output 914. In one embodiment, first regions 916 and second regions 917 include materials having desirable thermo-optic coefficients such that a temperature differential may provide a desirable diffraction of an incident optical signal. For example, first region 916 may include a first optical material having a positive thermo-optic coefficient and second region 917 may include a second material having a second thermo-optic coefficient. As such, a temperature differential provided to either or both first thermo-optic 909 and second thermo-optic array 915 may provide a modulated index of refraction for first regions 916 and second regions 917.

During use, a temperature differential may be provided to first thermo-optic array 909 and second thermo-optical array 915 such that an incident optical signal incident to one of the optical inputs 901, 902, 903, and 904 may be diffracted to a desirable optical output 911, 912, 913, or 914. For example an optical input may be incident to optical input 902 and switched or diffracted to any one of the optical outputs 911, 912, 913 and 914. As such, an optical signal incident to optical input 902 may be optically coupled to first thermo-optic array 915 through second input lens 906. Upon providing a temperature differential, the incident optical signal may be deflected from second optical input 902 to fourth optical output 914 through first thermo-optic array and second thermo-optic array 915. Upon the incident signal being diffracted by first thermo-optic array 909, the signal will be diffracted to second thermo-optic array 915 and optically coupled to optical output 914 through output lens 910. Therefore, a plurality of optical signals may be incident to an optical input switched to a desirable output by relative temperature differential to first thermo-optic array 909 and thermo-optic second array 915.

FIG. 10 is a schematic drawing illustrating a thermo-optic N×N deflection system having plural outputs in accordance with the teachings of the present invention. The system, shown generally at 1000, includes a plurality of optical inputs shown collectively at 1001 optically coupled to input lenses 1002. Input lenses 1002 are optically coupled to first thermo-optical array 1003, second thermo-optical array 1004, third thermo-optical array 1005, and fourth thermo-optical array 1006. First output lens 1007 and second output lens 1008 optically couple output array 1009 to first to thermo-optical arrays 1003, 1004, 1005, and 1006.

Output array 1009 includes a plurality of optical outputs for communicating signals. Optical output array 1009 includes a first group of optical outputs 1010 which include a first optical output 1010a, and a second optical output 1010b, and a third optical output 1010c. Output array 1009 also includes a second group of optical outputs 1011 which include a first optical output 1011a, a second optical output 1011b, a third optical output 1011c, a fourth optical output 1011d, and a fifth optical output 1011e. Optical output array 1009 also includes a third group of optical outputs 1012 which includes a first optical output 1012a, a second optical output 1012b, and a third optical output 1012b. Output array 1009 may include alternate configurations of optical groups which may include optical outputs from one or more additional groups. For example, optical output 1010a may be grouped with optical output 1012c.

During use an optical signal may be incident on input array 1001 such that the incident signal may be diffracted to a desirable output within an output array 1009. As such, a temperature differential may be provided to one of the thermo-optical arrays such that the signal incident to input array 1009 may be diffracted to a desirable output.

In one embodiment, a control circuit (not shown) may be used to deflect or switch an optical signal to a desirable optical output. For example, a control circuit may provide one or more temperature differentials to arrays 1003, 1004, 1005, 1006 such that a signal incident to optical input 1001 may be diffracted to a desirable optical output. Though not explicitly illustrated, an incident signal may be diffracted from first array 1003 to fourth array 1006 and subsequently to optical output 1012c by providing temperature differential using a control circuit and operable to produce the desired diffraction. For example, thermo-optic array 1003 may be operated at a larger temperature differential to produce a wide angle of diffraction than thermo-optic array 1006. As such, a plurality of temperature differentials may be used to produce a desired diffraction to an optical output.

FIG. 11 is a schematic illustration of a wide angle thermo-optic N×N deflection system in accordance with the teachings of the present invention. The system, illustrated generally at 1100, includes input array 1101 optically coupled to input lenses 1102. System 1100 also includes a first thermo-optic array 1103, a second thermo-optic array 1104, a third thermo-optic array 1105, and a fourth thermo-optic array 1106 optically coupled to input lenses 1102. Thermo-optic array 1103, 1104, 1105 and 1106 are optically coupled to output lens 1107 operable to communicate an optical signal to one of the optical outputs within optical output array 1108. As illustrated first thermo-optical array 1103 and second thermo-optical array 1104 have an opposing orientation relative to third thermo-optical array 1105 and fourth thermo-optical array 1106.

During use a temperature differential may be provided one or more thermo-optic array such that an optical signal incident to input array 1103 may be diffracted or switched a desirable amount such that a signal may be optically communicated to an optical output within output array 1108. As such, wide diffraction angles for incident signals may be provided by system 1100 for communicating incident optical signals to desirable output within output array 1108. For example, the configuration of system 1100 may allow for a signal to be diffracted a wide angle by providing a large relative temperature differential.

In another embodiment, one or more signals may be diffracted from one or more inputs to a desirable output. For example, a signal may be incident on each input within input array and diffracted or switched to a single output within output array 1108. As such, several signals may be diffracted from one or more input to a single output.

FIG. 12 is a schematic illustration of another wide angle thermo-optic deflection system in accordance with the teachings of the present invention. The system, illustrated generally at 1200, includes a plurality of thermo-optic arrays 1201 optically coupled to output lens 1202 and output array 1203. System 1200 may be optically coupled to a plurality of optical waveguides (not shown) such as a fiber optic cable or several fiber optic cables which may be proximal or distal to system 1200. Thermo-optic arrays 1201, being optically coupled to an optical input, may diffract an input signal to a desirable output by providing a temperature differential to one or more thermo-optic array. As such, an incident signal to thermo-optic arrays 1201 may be diffracted to a desirable output through output lens 1202 and optically couple to output array 1203. Wide angles of diffraction may be provided using various temperature differentials as required to produce a desirable angle of diffraction to switch a signal from an input to an optical output. As such, a plurality of thermo-optic arrays may be optically coupled to several inputs for switching or deflecting optical signals.

FIG. 13 is a schematic illustration of an N×N deflection system and control circuit in accordance with the teachings of the present invention. The system, illustrated generally at 1300, includes a thermo-optic N×N array 1301 which includes a plurality of thermo-optic arrays 1302 operable to communicate optical signals. Thermo-optic arrays 1302 are coupled to thermal elements 1303 operable to provide a temperature differential. Thermal elements 1303 are coupled to a voltage potential 1304 and control circuit 1305 for providing a potential to thermal elements 1303.

During use, control circuit 1305 may provide a signal or voltage operable to heat up or cool down any communication of thermal elements 1303. For example, one of the thermo-optic wave guides may be operable to diffract a signal based on a temperature differential. As such, control circuit 1305 may provide a desirable temperature differential to selective thermal elements 1303 such that an optical signal incident on thermo-optic arrays 1302 may be diffracted or switched to a desirable output (not shown).

In a preferred embodiemnt, thermal elements 1303 may include uniform heating electrodes shaped similarly to rectangular metal strips. Physical dimensions of thermal elements 1303 may include entirely covering thermo-optic arrays 1302 such that uniform temperature differentials may be provided to thermo-optic arrays 1302 to deflect an optical signal a desirable amount.

Though not illustrated, control circuit 1305 may be coupled to a processor or micro-processor operable to provide signals for diffracting or switching an optical signal to a desirable output. Though illustrated as a single voltage potential at 1304, system 1300 may be operable to provide different voltage levels to separate thermal elements. For example, control circuit 1305 may be coupled to a digital potentiometer operable to provide variable voltage levels. As, such a processor (not shown) may provide a desirable voltage to thermo-optic arrays 1302 to diffract or switch an optical signal. As such, the system illustrated in FIG. 13 exemplifies a basic or simple implementation of a control circuit for providing a potential to thermal elements 1303 and should not be viewed in a limiting sense but as an exemplary form.

FIG. 14 illustrates a communication network incorporating an N×N switching array system in accordance with the teachings of the present invention. The network, illustrated generally at 1400, includes a plurality of regions operable to communicate information via a fiber-optic network. Network 1400 includes a region A 1401, region B 1402, region C 1403, and region D 1404 optically coupled to an N×N array 1405. Region D is further coupled to region E 1407, and region F 1408 via N×N array 1406. Server 1409 is coupled to region F 1408 and N×N array 1410. N×N array 1410 is also coupled to first client terminal 1411, second client terminal 1412, and third client terminal 1413.

Communication between the regions, arrays, servers, client terminals, etc. may be provided through use of fiber-optic cable's. A general illustration of a fiber-optic cable having a plurality of fiber-optic waveguides illustrated at 1420 and 1421.

Fiber-optic cable 1420 having a plurality of fiber-optic waveguides 1421 may be coupled between regions via an N×N array. For example, region A 1401 may be coupled to N×N array 1405 via a fiber-optic cable having 10,000 channels or fiber-optic wave guides. Additionally, region 1404 may be coupled to N×N array 1405 via a fiber-optic cable having 1,000 channels or fiber-optic waveguides. As such, an optical signal may be communicated or switched by N×N array 1405 to a desirable channel or fiber-optic wave guide.

Network 1400 advantageously provides for high capacity fiber-optic utilization operable to communicate optical signals at high transmission capacities. In one embodiment, communication between each region may be observed as a "long haul" communication, a "regional" communication, a "metro" communication, and "user" communication regions. As such, N×N arrays 1405, 1506 and 1410 provide communication between the plurality of regions such that optical signals may be communicated to desirable destinations. For example, N×N array 1405 may include optical outputs and optical inputs between region A 1401 and region B 1402. As such, a control circuit may provide a control signal such that an optical signal may be switched using N×N array. For example, N×N array 1405 operable as a thermo-optic array may diffract or switch a signal in response to a temperature differential. As such, an optical signal from region A 1401 may be switched or diffracted by N×N array 1405 to region C 1403.

In another embodiment network 1400 may be operable to communicate or switch optical signals between server 1409 and client terminals 1411, 1412 and 1413. For example, a control circuit (not shown) operably coupled to N×N array 1410 may switch or diffract optical signals between server 1409 client terminals 1411, 1412 and 1413 by providing a signal operable to create a temperature differential such that an optical signal incident to N×N array 1410 may be switched or diffract between a client terminal and server 1409. As such, N×N array 1410 may provide efficient communication between server 1409 and client terminals 1411, 1412 and 1413.

Several different optical components and methods of fabricating optical devices have been disclosed. In one embodiment, aspherical lenses may be used for correcting or reducing aberrations which may be associated with optical signals. The present invention advantageously allows for fabrication of lenses using conventional semiconductor processes. As such, desirable control over lens characteristics may be achieved which conventional fabrication techniques may not. For example, lenses 702 and 704 illustrated in FIG. 7 may be fabricated using a photolithography process. As such, lenses 702 and 704 may not require the use of, for example, antireflective coatings that may be associated with conventional lens processing fabricated in free space.

Further improvements on device performance may be achieved by selecting optical polymers or other materials having higher thermo-optic coefficients, employing longer device lengths, and using more efficient thermoelements such as chromium heating electrodes. Several embodiments of thin-film waveguide beam deflectors disclosed may be operable in many types of applications such as laser beam steering, optical storage, and optical communication associated communication systems.

Although the disclosed embodiments have been described in detail, it should be understood that various changes, substitutions and alterations can be made to the embodiments without departing from their spirit and scope.

What is claimed is:

1. An optical switching device for communicating optical signals in a communications network comprising:
    a plurality of inputs optically coupled to at least one thermo-optic array;
    a plurality of outputs optically coupled to the thermo-optic array;
    the plurality of inputs and outputs operable to communicate at least one optical signal via the thermo-optic array;
    the thermo-optic array including a first prism having a first material with a first index of refraction and a second prism having a second material with a second index of refraction; and
    the first index of refraction and the second index of refraction operable to be modulated in response to a temperature differential.

2. The device of claim 1, further comprising:
    a first thermo-optic array having a first orientation; and
    a second thermo-optic array having a second orientation.

3. The device of claim 1, wherein the thermo-optic array comprises a thermal element thermally coupled to the thermo-optic array to provide a temperature differential.

4. The device of claim 1, further comprising an output lens coupled between the thermo-optic array and the plurality of outputs.

5. The device of claim 4, further comprising a plurality of optically coupled thermo-optic arrays operable to communicate the optical signals.

6. The device of claim 1, wherein the thermo-optic array may be operable to provide a wide angle of diffraction in response to a temperature differential.

7. The device of claim 1, wherein the thermo-optic array comprises:
    a cladding layer coupled to a substrate;
    an optical guide layer coupled to the cladding layer; and
    a thermal element thermally coupled to the guide layer.

8. The device of claim 1, further comprising at least one input lens optically coupled between the thermo-optic array and at least one of the optical inputs.

9. The device of claim 1, wherein the thermo-optic array comprises a control circuit operable to selectively switch the optical signal from one of the plurality of inputs to one of the plurality of outputs.

10. The device of claim 9, wherein the control circuit selectively maintains a selected temperature associated with the thermo-optic array to provide a desired diffraction of the optical signal.

11. An network communications system for communicating optical signals comprising:
    a communication medium operable to communicate the optical signals;
    a plurality of optical waveguides associated with the communications medium;
    a switching device operable to communicate the optical signals from an initiating point to a destination point, the switching device comprising:
        an input optically coupled to at least one of the plurality of optical waveguides;
        an output optically coupled to at least a first thermo-optic array; and
        the first thermo-optic array operable to deflect the optical signals from the initiating point to the destination point;
        the thermo-optic array including a first prism having a first material with a first index of refraction and a second prism having a second material with a second index of refraction; and
        the first index of refraction and the second index of refraction operable to be modulated in response to a temperature differential.

12. The system of claim 11, wherein the switching device comprises a plurality of inputs optically coupled to the plurality of optical waveguides.

13. The system of claim 11, wherein the initiating point comprises a first region having a first communication capacity and the destination point comprises a second region having a second communication capacity.

14. The system of claim 13, wherein the second region comprises a server.

15. The system of claim 13 wherein the second region comprises a client.

16. The system of claim 11 wherein the switching device further comprise a plurality of thermo-optic arrays optically coupled to the plurality of optical waveguides.

17. The system of claim 11 further comprising a control circuit operable to switch the optical signals between the initiating point to the destination point.

18. The system of claim 11, further comprising a second thermo-optic array optically coupled to the first thermo-optic array, the second thermo-optic array operable to communicate the optical signals deflected from the first thermo-optic array.

19. An optical switching device for communicating optical signals comprising:
    a plurality of optical inputs operable to communicate optical signals;
    a plurality of optical outputs operable to communicate optical signals;
    at least one thermo-optical array optically coupled to the plurality of optical inputs and the plurality of optical outputs;
    the thermo-optical array operable to selectively deflect an optical signal from one of the plurality of optical inputs to one of the plurality of optical outputs in response to a temperature differential and the thermo-optical array comprising an optical prism.

20. An optical switching structure for communicating optical signals comprising:

a first cladding layer coupled to a substrate;

an optical switching layer coupled to the cladding layer, the optical switching layer having a first and second material operable to form an array; a thermal element coupled to the optical switching layer, the thermal element operable to alter a temperature associated with the optical switching layer and the array comprising an optical prism.

21. The structure of claim 20, wherein the optical switching layer comprises plural arrays.

22. The structure of claim 20, wherein the first material comprises silica.

23. The structure of claim 20, wherein the second material comprises polymer.

24. The structure of claim 20, wherein the thermal element comprises an electrode.

25. The structure of claim 20, further comprising an optical lens optically coupled to the optical switching layer.

26. The structure of claim 20, further comprising a control circuit coupled to the thermal element.

* * * * *